Figure 1:
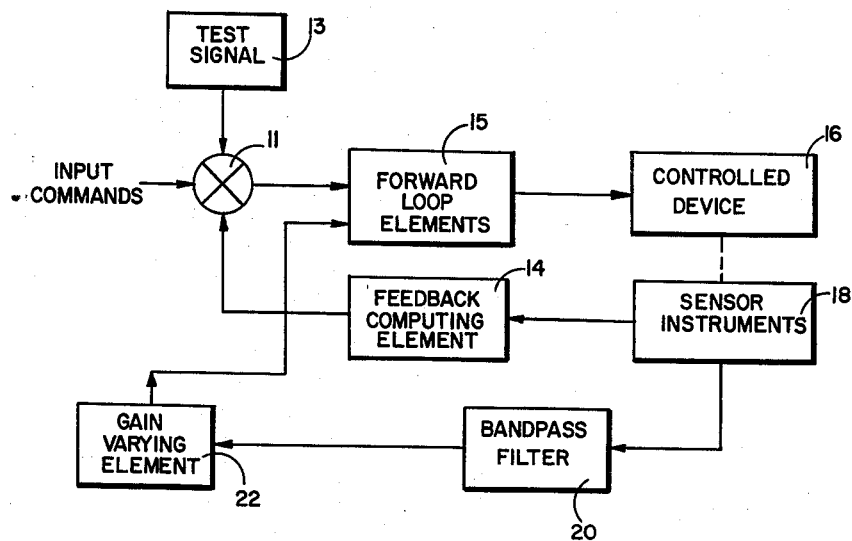

INVENTOR.
RICHARD K. SMYTH

AGENT

Nov. 5, 1963  R. K. SMYTH  3,109,970
SELF-ADAPTIVE SERVO SYSTEM
Filed Dec. 9, 1959  3 Sheets-Sheet 2

INVENTOR.
RICHARD K. SMYTH
BY
*Edward A. Sokolski*
AGENT

INVENTOR.
RICHARD K. SMYTH

United States Patent Office 3,109,970
Patented Nov. 5, 1963

3,109,970
SELF-ADAPTIVE SERVO SYSTEM
Richard K. Smyth, Downey, Calif., assignor to North American Aviation, Inc.
Filed Dec. 9, 1959, Ser. No. 858,391
8 Claims. (Cl. 318—28)

This invention relates to a self-adaptive servo system and more particularly to a servo system in which variation of the environment of a device controlled by the system will have a minimum effect upon the control of the device.

A self-adaptive servo system may be defined as one having the ability to automatically change one or more of its parameters in adaptation to a changing internal or external environment of the device under control. Such self-adaptation is accomplished through an internal process of measurement and evaluation. Self-adaptive systems have been found most useful in situations (1) where the controlled element undergoes large changes in its dynamic characteristics; (2) when precise prior knowledge of the controlled element characteristics is not available and/or; (3) when the situation is such that preprogrammed or prescheduled changes in the control system parameters are not feasible. One or more of these conditions is generally present in aircraft and all of them generally present themselves in vehicles which must operate both in the atmosphere and outer space. The extreme variations in vehicle operating conditions which occur between atmospheric and outer space flight make the control problem a difficult one which a self-adaptive type system is particularly well suited to handle. While it will be understood that the present invention is applicable to a large class of closed loop control systems, the invention will be described herein with particular reference to a vehicle control system.

Because an outer space mission involves flight into regimes not fully explored by manned vehicles, precise prior knowledge of the vehicle characteristics is not available. Further, suitable sensing instruments are not available to make measurements of the environment during much of the proposed mission; therefore, it is not feasible to schedule control parameters as a function of measurements made on the environment. Nor, is it feasible to use preprogrammed parameter variations, because the precise trajectory to be flown is not known prior to a particular flight. A self-adaptive system which will automatically adjust the control system to widely changing conditions to bring the vehicle response to an optimum point is therefore particularly well suited to a space vehicle.

Several adaptive systems have been developed which are of the passive type, the term passive being used to denote that no adjustment of system parameters is made. The general object of this type of system is to make the vehicle control system closed loop response equivalent to that of an ideal controlled element, this ideal being defined by experimentally derived criteria. Such systems making use of large amounts of negative feedback are predicated on a high loop gain. Under radically changing environmental conditions it is therefore difficult to maintain such a system stable. In the device of this invention, this shortcoming is overcome and an improved adaptation attained by varying the gain of the servo system automatically in response to variations in the response of the controlled device to a test signal input. A negative feedback loop is utilized to assist in bringing the response of the controlled device as close to an optimum or "model" response as is feasible. In this feedback loop, the response of the controlled device is sensed by various sensing instruments and the outputs of these sensing instruments weighted in an ideal relationship. The negative feedback signal therefore will have an ideal or optimum amplitude. Basically, the loop gain of the complete servo loop (including the controlled device) may be maintained constant by varying a single variable gain element in the system. As the internal and external environments of the controlled device changes, the gain of the control system is changed correspondingly by varying the variable gain element in accordance with the changes in the response of the controlled device. Thereby, changes in the response of the controlled device are compensated for, the overall loop gain being maintained constant.

It is therefore an object of this invention to provide an improved self-adaptive servo system.

It is a further object of this invention to facilitate the control of aircraft and space vehicles under changing environmental conditions.

It is a still further object of this invention to provide a simple yet effective means for automatically adapting a servo system to changing environmental conditions.

It is a still further object of this invention to provide an improved servo system wherein the effective overall loop gain is maintained constant.

Figure 2:
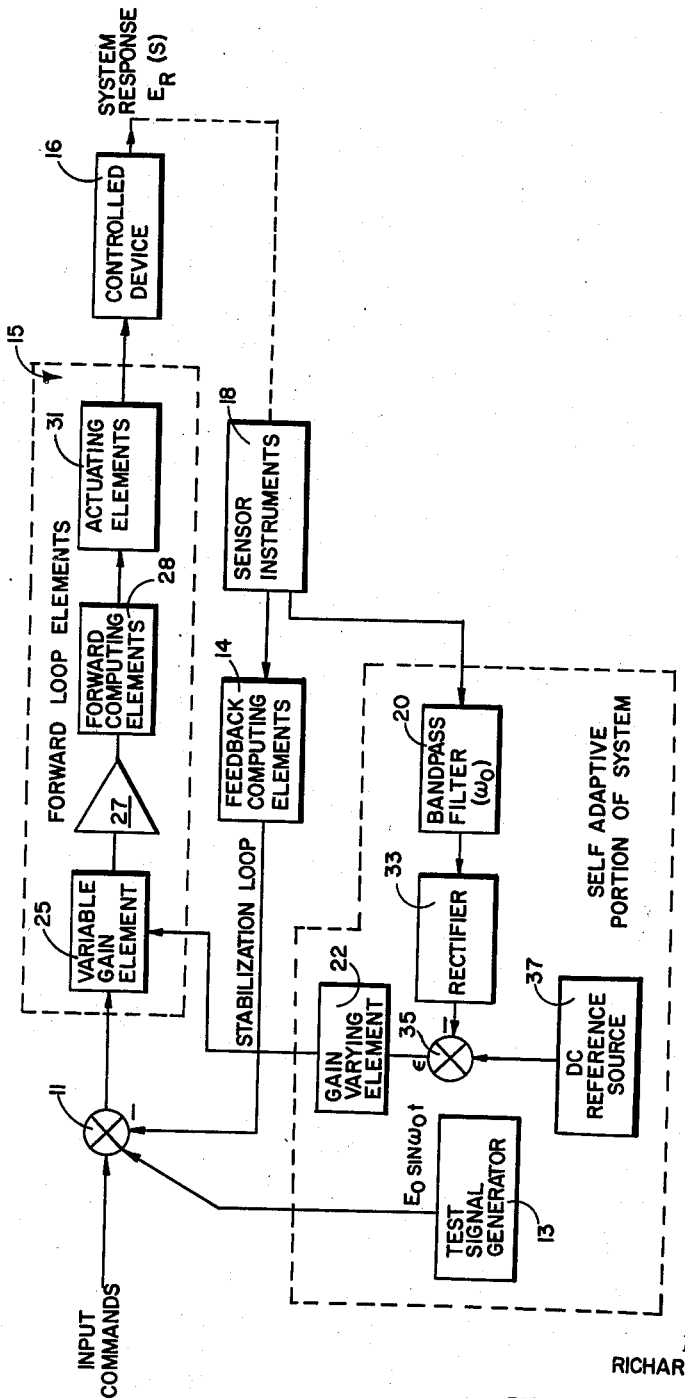
Figure 3:
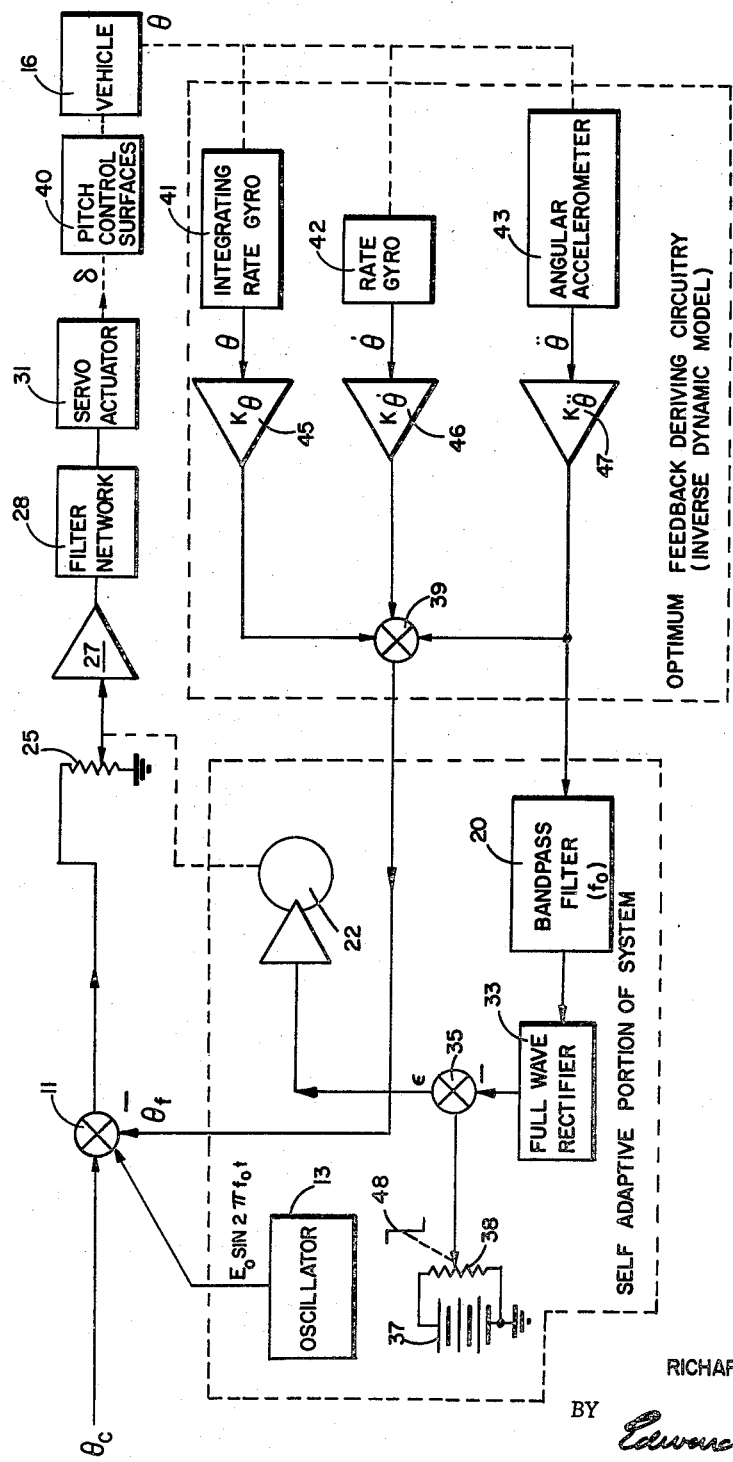

Other objects of this invention will become apparent from the following description taken in connection with the accompanying drawings, in which FIG. 1 is a block diagram illustrating the basic operation of a device constructed in accordance with the invention;

FIG. 2 is a block diagram of a basic servo system incorporating the device of the invention; and FIG. 3 is a functional block diagram illustrating the application of the device of the invention to a space or airborne vehicle pitch control system.

In the drawings, like reference characters refer to like parts.

Referring now to FIG. 1, the basic operation of the device of the invention is illustrated. Input commands are fed to summing device 11. An oscillatory continuous test signal of predetermined frequency from test signal generator 13 is also fed to summing device 11 as well as a negative feedback signal from the feedback computing elements 14. The output of summing device 11 is fed to the forward loop elements 15 where, as to be explained in detail further on in the specification, they are amplified and converted to an appropriate control signal for controlled device 16. The actual response of controlled device 16 is sensed by sensor instruments 18. The output of sensor instruments 18 is fed to the feedback computing elements 14 where these sensor instrument outputs are properly weighted, combined and amplified as application demands may dictate. The output of the feedback computing elements is fed as a negative feedback signal to summing device 11 to act as a stabilization signal. A selected output from sensor instruments 18 is fed to bandpass filter 20 which is tuned to the frequency of the output of test signal generator 13. Bandpass filter 20 should be a narrow band maximumly flat filter such as, for example, a second order Butterworth bandpass filter so that it will pass the signals present in the output of the sensor instruments at the frequency of the test signal generator but will substantially reject all other frequencies. The output of bandpass filter 20 is fed to gain varying element 22. Gain varying element 22 is driven in response to the output of bandpass filter 20 to reproduce a mechanical or electrical output signal capable of controlling the gain of forward loop elements 15 in accordance with the output of bandpass filter 20. The servo system thus comprises a negative feedback loop for stabilization purposes as indicated by feedback loop elements 14 operating in conjunction with sensor instruments 18. In addition, to automatically adapt the system to changes in the response of controlled device 16 with changes in the operating environment or the like, the response of the system to a test signal generated by signal generator 13 is constantly measured by sensor instruments 18 and a control signal proportional to the measured response of controlled device 16 to the test signal is developed to vary the gain of the forward loop of the servo system in inverse relationship to this response. In this manner, the effective overall loop gain of the system is maintained constant and the system thereby "self-adapts" itself to changing environmental conditions.

Referring now to FIG. 2, a self-adaptive servo system incorporating the device of the invention is illustrated. Input commands are fed to summing device 11 where, as already explained, they are summed with the output of test signal generator 13 and that of the feedback computing elements 14. The output of test signal generator 13 should have a fixed amplitude and should have a frequency which is large compared with the dominant natural frequency of the closed loop control system. The test signal will appear as a disturbance to the normal control processes and therefore must be limited in amplitude so that it will produce no greater a disturbance than is found tolerable. A multivibrator with a square wave output or a sine wave oscillator may be utilized as the test signal generator. Let us assume, for illustrative purposes, that test signal generator 13 has an output, $E_0 \sin \omega_0 t$, where $E_0$ is a constant peak amplitude and $\omega_0$ is a constant angular velocity. The output of summing device 11 is fed to the forward loop elements 15 which has as its input element variable gain element 25. Variable gain element 25 may be any device, the effective output of which can be controlled by the gain varying element 22. If, for example, gain varying element 22 comprises a servo motor, variable gain element 25 may be a potentiometer whose movable arm is driven by the motor of gain varying element 22 to vary the gain of the control system. The variable gain element may be included elsewhere in the servo loop if so desired. The signal is fed from variable gain element 25 to amplifier 27 where it is appropriately amplified and fed to forward computing elements 28. Forward computing elements 28 may comprise a stabilization network and appropriate filters to bring the actuating signal to proper form for controlling actuating elements 31. Actuating elements 31 will control controlled device 16 in response to the actuating signal and may, for example, comprise an electrically driven mechanical actuator.

Controlled device 16 will have a response which may be designated the system response, $E_r(S)$. This system response is the effective reaction of controlled device 16 to actuating elements 31 as affected by both internal and external environmental conditions under which the controlled device 16 may be operating. The system response will generally be manifested in the form of a mechanical motion. Sensor instruments 18 will detect the mechanical system response, $E_r(S)$ and convert this response to an appropriate electrical signal. Sensor instruments 18 may involve several measurements which when properly weighted in feedback computing elements 14 establish a criterion of the system response. What this criterion is, of course, depends on the nature of the controlled device and the input command signals. The output of sensor instruments 18 is feed to feedback computing elements 14 where the individual sensor instrument outputs may be appropriately weighted and amplified and then combined to form a single stabilization feedback signal. In some instances, there may be only a single sensor instrument 18 and feedback computing elements 14 may be needed only to amplify this single feedback output. The output from one or more sensor instruments 18 is feed to bandpass filter 20 which is tuned to pass signals at the frequency of the test signal fed to the system from test signal generator 13 and to substantially reject all other frequency signals. The output of bandpass filter 20 will therefore be a direct indication of the response of the system to the test signal $E_0 \sin \omega_0 t$ as sensed by the sensor instruments whose output is fed to the bandpass filter. The output of bandpass filter 20 is converted to a D.-C. signal by rectifier 33, the output of rectifier 33 being fed to summing device 35. Reference voltage is supplied by D.-C. reference source 37, summing device 35 having as its output the difference between the output of D.-C. reference source 37 and that of rectifier 33. D.-C. reference source supplies a bias establishing the preselected quiescent or "normal" adaptive signal operating point about which the system gain will be varied with changes in system response.

The output of summing device 35 which is the self-adaptive error signal ε is fed to gain varying element 22 which effectively controls the gain of the forward loop elements by controlling variable gain element 25.

Gain varying element 22 may, for example, comprise a D.-C. amplifier and variable gain element 25 may be the bias supply for amplifier 27, the variation in the bias to amplifier 27 produced by the changing output of the D.C. amplifier effectively changing the gain of the forward servo loop. As already noted, gain varying element 22 may also comprise a servo motor while variable gain element 25 is a potentiometer, the movable arm of which is controlled by the motor. At any rate, any means which will change the gain of the forward loop in accordance with the output of summing device 35 will be adequate. It is to be noted that in view of the action of bandpass filter 20, the gain of the forward loop is varied only in accordance with the response of the system to the test signal and is not a function of the response to other inputs. Therefore, as long as the output of the test signal generator is kept constant, the gain controlling signal will be a reliable indication of changes in the response of the system due to environmental conditions, both internal and external. As indicated by the lower inclosed dotted portion of FIG. 2, the self-adaptive portion of the system comprises bandpass filter 20, rectifier 33, D.-C. reference source 37, summing device 35 and gain varying element 22.

Referring now to FIG. 3, an air or space vehicle pitch control system incorporating the device of this invention is illustrated. Pitch control signals, $\theta_c$ are fed to summing device 11. The output $E_0 \sin 2\pi f_0 t$ of oscillator 13, which should have a constant amplitude $E_0$ and a fundamental frequency component, $f_0$, is also fed to summing device 11. Experimentation has indicated that an oscillator having a fundamental frequency output of about 10 cycles per second will function adequately in most vehicle systems wherein the dominant natural frequency of the system loop is substantially below this test frequency. A multivibrator having a fundamental frequency equal to the desired test frequency, $f_0$ may be utilized instead of the sinusoidal oscillator. Summing device 11 also receives the pitch feedback signal $\theta_f$ from the feedback circuitry, which will be described in detail further on.

The output of summing device 11 is fed to one side of potentiometer 25, the other end of this potentiometer being grounded. Potentiometer 25 serves as the variable gain element, the position of the arm of this potentiometer being controlled by servo-motor 22 which is responsive to the self-adaptive control signal ε. The arm of potentiometer 25 is coupled to the input of amplifier 27. As can be seen, the position of the arm of potentiometer 25 determines the amplitude of the signals fed to amplifier 27 and thereby affects the gain of the system. The output of amplifier 27 is filtered to remove spurious unwanted signals by filter network 28 and fed to servo-actuator 31. Amplifier 27 is a conventional voltage and power amplifier having as its output a signal capable of driving servo actuator 31.

Servo actuator 31 may comprise a combination of electrical and hydraulic servos such as are normally used to actuate the control surfaces, reaction nozzles, or thrust vectoring mechanisms of an aircraft or missile. For exemplary purposes, a vehicle using control surfaces will be discussed, but it is to be clearly understood that this device could also be readily applied where other types of control mechanisms are utilized. Servo actuator 31 will mechanically move the pitch control surfaces 40 in accordance with its input. In accordance with the actuation of the pitch control surfaces, the vehicle 16 will have a pitch response $\theta$. Integrating rate (or displacement) gyro 41, rate gyro 42, and angular accelerometer 43 are all attached to the vehicle frame in such a manner as to respectively sense the vehicle pitch $\theta$, the vehicle pitch rate $\dot\theta$, and the vehicle pitch acceleration $\ddot\theta$. As is well known in the art, the summation of these three outputs will provide a good pitch feedback signal. Experimentation has indicated that such a signal may be further enhanced by properly weighting the amplitudes of these three signals in the combined feedback signal. What this ideal weighting is may change with radical design changes in aircraft and when more information is derived on the characteristics of manned space vehicles, but at the present time, the results of the Cornell Iso Opinion Tests made at the Cornell Aeronautical Laboratories are widely accepted as applicable to present-day aircraft. These studies which involve the plotting of opinion information derived from a great number of pilots indicates that the ideal response of an aircraft is attained with a negative feedback signal comprising pitch $\theta$, pitch rate $\dot\theta$, and pitch acceleration $\ddot\theta$ each multiplied by a separate constant $K_\theta$ for pitch, $K_{\dot\theta}$ for pitch rate, and $K_{\ddot\theta}$ for pitch acceleration which are related as follows:

$$\frac{K_{\dot\theta}}{K_{\ddot\theta}} = \sqrt{2}\cdot\pi \quad (1)$$

and $$\frac{K_\theta}{K_{\ddot\theta}} = \pi^2 \quad (2)$$

Along these lines the effective gain of amplifier 45, 46, and 47 should be weighted to satisfy these relationships. The combined output signal, as summed in summing device 39, which comprises the outputs of amplifiers 45, 46, and 47, will then have the optimum or model component ratios of $\theta$, $\dot\theta$, and $\ddot\theta$. The circuitry involved in obtaining the three components $\theta$, $\dot\theta$, and $\ddot\theta$, properly weighting these three to an ideal ratio, and then summing the three components to form a pitch feedback signal may be termed the optimum feedback deriving circuitry. As combined in the feedback circuitry of an adaptive servo system, such circuitry is often referred to in the art as an inverse dynamic model. The output of summing device 39 will therefore be the model or optimum negative feedback pitch signal $\theta_F$.

The output of amplifier 47, which represents the pitch acceleration signal $\ddot\theta$, is fed to bandpass filter 20. Bandpass filter 20, having a narrow pass band, will pass the pitch acceleration signal substantially at the frequency $f_0$ of the input test signal from oscillator 13. All other pitch acceleration components of different frequency will be filtered out. Therefore, the output of bandpass filter 20 will represent the response of the system to the constant amplitude test signal generated by oscillator 13 at the test frequency $f_0$. The pitch acceleration signal $\ddot\theta$ is a good indication of the pitch response of the system, but it is to be noted that the pitch signal $\theta$ and the pitch rate signal $\dot\theta$ also are indicative of the system response, and the output of amplifier 45 or that of amplifier 46 are a suitable combination could be used in place of that of amplifier 47 as the response indicating signal fed to bandpass filter 20.

The output of bandpass filter 20 is rectified in a full-wave rectifier 33 and fed as a negative polarity signal to summing device 35. Also fed to summing device 35 is a positive bias voltage supplied by D.-C. source 37 which may be adjusted by means of potentiometer 38. The arm of potentiometer 38 may be set by means of a control knob 48 to any desired value to establish the normal operating point for gain varying servo motor 22. The voltage output from potentiometer 38 to summing device 35 may be equated in magnitude to the negative output of full-wave rectifier 33 under preselected normal operating conditions. This establishes the quiescent operating point for the self-adaptive gain control signal. At this point there will be no output signal from summing device 35 to drive servo motor 22 and the arm of potentiometer 25 will be maintained at rest. Potentiometer 25 will be maintained in this "normal" resting position as long as the overall system response is in this predetermined "normal" state. If the vehicle response to the test signal should, for example, increase resulting in a greater pitch output, this will manifest itself as an increased negative output from full-wave rectifier 33 which will in turn produce an output signal from summing device 35 to drive servo motor 22. Servo motor 22 is of the integrating type having an output shaft rotational displacement continually responsive to the servo input signal and will continue to drive the arm of potentiometer 25 until the gain of the system has been reduced sufficiently to restore the effective overall response to the test signal to the original "normal" state. At this time the output of full-wave rectifier 33 will again equate with the voltage at the arm of potentiometer 38, and there will be no output from summing device 35. The system gain now is established at a new level to properly account for the new environmental characteristics. It thus can be seen that with changes in the overall response of the system to the test signal as manifested by a change in the effective pitch of the vehicle in response to this signal, a signal will be developed which will automatically change the effective gain of the system to restore its effective response to the original "normal" state. It is to be noted that servo motor 22 must be connected to potentiometer 25 so as to decrease the signal output from this potentiometer with increases in the negative output from full-wave rectifier 33.

It can readily be seen that similar circuitry as described for the pitch control system may be used in the yaw and roll control systems of the vehicle. The self-adaptive portion of the system as indicated within the dotted line in FIG. 3 comprises bandpass filter 20, full-wave rectifier 33, summing device 35, test oscillator 13, servo motor 22, and the reference voltage circuitry which includes voltage source 37 and potentiometer 38.

The above described self-adaptive system has the advantages of simplicity coupled with a high degree of effectiveness in adapting to widely changing operating environments. While such a system will certainly have great advantages in aircraft, its capabilities will become most apparent in vehicles for space flight which must operate both in the atmosphere and in outer space.

While the device of this invention has been described and illustrated in detail, it is to be clearly understood that the same is by way of illustration and example only and is not to be taken by way of limitation, the spirit and scope of this invention being limited only by the terms of the appended claims.

I claim:

1. A self-adaptive servo system for controlling a device in response to input command signal comprising means for sensing response of the controlled device and producing an electrical output proportional thereto, means for generating an oscillatory test signal, means for combining in the same channel the output of said test signal generating means and said input command, signal forward loop means responsive to the output of said combining means for actuating said device, a bandpass filter tuned to the frequency of said test signal generating means, said bandpass filter being connected to the output of said sensing means, and means responsive to the output of said bandpass filter for controlling the gain of said forward loop means, said means responsive to the output of said filter including an integrator.

2. The device as recited in claim 1 wherein said forward loop means includes a potentiometer for varying the gain thereof and said means for controlling the gain of said forward loop means comprises a servo-motor, the output shaft of the motor being coupled to the movable arm of said potentiometer.

3. The device as recited in claim 1 and additionally comprising a fixed voltage reference source and means for comparing the output of said filter with the output of said voltage source, the output of said comparing means being used to control the gain of said forward loop means.

4. A self-adaptive servo system for controlling a device in response to input command signal comprising means for sensing mechanical motion of the controlled device and producing an electrical output proportional thereto, means for generating an oscillatory test signal, means responsive to said sensing means for generating a negative feedback signal, means for combining the outputs of said test signal generating means, said feedback generating means and said input command signal, forward loop means responsive to the output of said combining means for controlling said device, a bandpass filter tuned to the frequency of said test signal generating means, said bandpass filter being connected to the output of said sensing means, and means responsive to the output of said bandpass filter for controlling the gain of said forward loop means, said means responsive to the output of said filter including an integrator.

5. In a servo system for use in air and space vehicle control systems to actuate the vehicle control mechanisms for at least a single axis of motion, forward loop elements comprising an amplifier, a variable gain element for controlling the input to said amplifier, forward computing elements connected to receive the output of said amplifier, and actuating elements responsive to the output of said forward computing elements, said vehicle control mechanisms being responsive to said actuating elements; a sensing instrument mounted on said vehicle to sense vehicle response to said control system on said single axis; means for generating an oscillatory test signal; means for combining the control system input command signal and said oscillatory test signal, the output of said combining means being coupled as the input to said forward loop elements; a bandpass filter tuned to pass substantially only the frequency of said test signal, said filter being connected to the output of at least one of said sensing instruments; means for rectifying the output of said filter; a source of D.-C. reference voltage; means connected to the outputs of said reference source and said rectifying means for deriving the difference thereof; and gain varying means comprising an integrator responsive to the output of said difference deriving means for controlling said variable gain element in accordance with the integral of said difference deriving means output whereby the gain of the overall servo system loop is maintained constant.

6. In a servo system for use in air and space vehicles comprising a control system for actuating the vehicle control mechanisms for at least a single axis of motion, forward loop elements comprising an amplifier, a variable gain element connected to control the input to said amplifier, forward computing elements connected to receive the output of said amplifier, and actuating elements responsive to the output of said forward computing elements, said vehicle control mechanisms being responsive to said actuating elements; sensing instruments mounted on said vehicle to sense the vehicle response to said control system about said single axis; means for generating an oscillatory test signal; means for weighting the output of said sensing instruments to a predetermined optimum relationship; means for combining said weighted outputs to form an optimum negative feedback signal; means for combining the control system input command signal, said oscillatory test signal, and said negative feedback signal, the output of said combining means being coupled as the input to said forward loop elements; a bandpass filter tuned to pass substantially only signals at the frequency of said test signal, said filter being connected to the output of at least one of said sensing instruments; means for rectifying the output of said filter; a source of D.-C. reference voltage; means connected to the outputs of said reference source and said rectifying means for deriving the difference thereof; and gain varying means comprising an integrator responsive to the output of said difference deriving means for controlling said variable gain element in accordance with the integral of said output whereby the gain of the overall servo system loop is maintained constant.

7. The device as recited in claim 6 wherein said variable gain element is a potentiometer and said integrator comprises a servo-motor, the motor output shaft thereof being coupled to drive the arm of said potentiometer.

8. In a servo system for use in air and space vehicles comprising a control system used to actuate the vehicle control mechanisms for at least a single axis of motion, forward loop elements comprising an amplifier, a variable gain element for controlling the input to said amplifier, a filter network connected to receive the output of said amplifier, and a servo-actuator responsive to the output of said forward computing elements, said vehicle control mechanisms being responsive to said servo-actuator; sensing instruments mounted on said vehicle to sense the vehicle response to said control system in said single axis; an oscillatory test signal generator; a plurality of amplifiers having predetermined relative gain, the output of each of said sensing instruments being fed to a separate preselected amplifier; a first signal mixing device, the outputs of said amplifiers being fed to said first signal mixing device; a second signal mixing device, system input command signal, said oscillatory test signal, and the output of said first signal mixing device being fed thereto, the output of said second signal mixing device being coupled as the input to said forward loop elements; a bandpass filter tuned to pass substantially only the frequency of said test signal, said filter being connected to the output of at least one of said sensing instruments; a rectifier connected to the output of said filter; a source of D.-C. reference voltage; a difference deriving device connected to receive the outputs of said reference source and said rectifier; and a gain varying device comprising an integrator responsive to the output of said difference deriving device, said gain varying device being connected to control said variable gain element whereby the gain of the overall servo system loop is maintained constant.

References Cited in the file of this patent

UNITED STATES PATENTS

| | | |
|---|---|---|
| 2,862,167 | Curry | Nov. 25, 1958 |
| 2,880,384 | Surtees | Mar. 31, 1959 |
| 2,990,504 | White | June 27, 1961 |